(12) United States Patent
Yamamoto

(10) Patent No.: US 7,196,990 B2
(45) Date of Patent: Mar. 27, 2007

(54) INFORMATION RECORDING SCHEME FOR PREVENTING RECORDING FAILURE RESULTING FROM IMPACT OR VIBRATION

(75) Inventor: Kazutaka Yamamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/037,300

(22) Filed: Jan. 19, 2005

(65) Prior Publication Data

US 2005/0122869 A1    Jun. 9, 2005

Related U.S. Application Data

(63) Continuation of application No. 10/233,416, filed on Sep. 4, 2002.

(30) Foreign Application Priority Data

Sep. 12, 2001   (JP)   ............... 2001-276971

(51) Int. Cl.
*G11B 5/09*     (2006.01)
*G11B 7/00*     (2006.01)

(52) U.S. Cl. .................. 369/53.18; 369/53.13; 369/47.11; 369/44.32

(58) Field of Classification Search .............. None
See application file for complete search history.

(56) References Cited

U.S. PATENT DOCUMENTS

| | | | |
|---|---|---|---|
| 4,669,072 A | 5/1987 | Miura et al. | |
| 4,835,754 A | 5/1989 | Yamamoto et al. | |
| 5,012,461 A | 4/1991 | Yoshida et al. | |
| 5,224,085 A | 6/1993 | Shinkai et al. | |
| 5,471,449 A | 11/1995 | Kaneko et al. | |
| 5,557,183 A | 9/1996 | Bates et al. | |
| 5,737,481 A | 4/1998 | Gushima et al. | |
| 5,819,252 A | 10/1998 | Benson et al. | |
| 5,886,966 A | 3/1999 | Ota et al. | |
| 6,141,305 A | 10/2000 | Tsutsui | |
| 6,163,515 A | 12/2000 | Yamamoto | |
| 6,198,707 B1 | 3/2001 | Yamamoto | |
| 6,219,317 B1 | 4/2001 | Tsutsui | |
| 6,335,910 B1 | 1/2002 | Yoshizawa et al. | |
| 6,418,099 B2 | 7/2002 | Yamamoto | |
| 6,930,964 B2 * | 8/2005 | Matsui ............. | 369/47.3 |

(Continued)

FOREIGN PATENT DOCUMENTS

EP     1 103 970 A2    5/2001

(Continued)

*Primary Examiner*—Muhammad Edun
(74) *Attorney, Agent, or Firm*—Dickstein Shapiro LLP (57) ABSTRACT

An information recording apparatus includes: an information recording part performing information recording on a recording medium divided into a plurality of sectors each including a plurality of information units; a prediction part detecting or predicting an occurrence of a recording failure during the information recording; a suspension control part suspending the information recording at the present one of the information units of the recording medium and storing suspension information indicating a suspension position where the information recording is suspended; a determination part determining whether the recording failure is over after the suspension of the information recording; and a resumption control part causing the information recording part to resume the information recording at a position determined based on the suspension information so that information is continuously recorded on the recording medium over the suspension position.

15 Claims, 6 Drawing Sheets

U.S. PATENT DOCUMENTS

| | | |
|---|---|---|
| 6,950,381 B2 * | 9/2005 | Yada et al. .............. 369/53.45 |
| 2001/0053112 A1 | 12/2001 | Matsui |
| 2002/0044507 A1 | 4/2002 | Hagiwara et al. |
| 2002/0060961 A1 | 5/2002 | Yamamoto |
| 2002/0126612 A1 | 9/2002 | Yamamoto |

FOREIGN PATENT DOCUMENTS

| | | |
|---|---|---|
| EP | 1 168 316 A2 | 1/2002 |
| JP | 03116443 | 5/1991 |
| JP | 7-31904 | 4/1995 |
| JP | 11-167721 | 6/1999 |
| JP | 2000-260032 | 9/2000 |
| JP | 2001-023176 | 1/2001 |
| JP | 2001-67819 | 3/2001 |
| JP | 2002-298496 | 10/2002 |

* cited by examiner

INFORMATION RECORDING SCHEME FOR PREVENTING RECORDING FAILURE RESULTING FROM IMPACT OR VIBRATION

The present application is a continuation of application Ser. No. 10/233,416, filed Sep. 4, 2002, the entire disclosure of which is incorporated herein by reference.

BACKGROUND OF THE INVENTION

1. Field of the Invention

The present invention relates to information recording, and more particularly to information recording on a recording medium such as a CD-R (compact disk recordable) or a CD-RW (compact disk rewritable) by an information recording apparatus such as an optical disk unit.

2. Description of the Related Art

In a recording medium such as a magneto-optical (MO) disk or an MD (Mini Disc), data is written to the recording medium in small units so that data once recorded thereon can be rewritten. When a failure occurs in writing, recovery from the failure can be made by performing another normal writing operation. In some non-rewritable recording media, recovery from failure can be achieved by a replacement operation by which the defective sector including a failure is replaced by another normal sector.

However, in the case of a recording medium on which data is recorded with a CD format with no writing unit, such as the CD-R, there is no effective means for recovering from failure in writing. Therefore, as has been the case for a long time, the recording medium becomes unusable only to be discarded if a failure occurs during data writing.

Although the CD-R has such a disadvantage, its low price and high compatibility in reproduction has made the CD-R extremely popular. Further, the disadvantage of the CD-R has been eliminated recently.

Japanese Laid-Open Patent Application No. 2001-67819 and Japanese Published Examined Application No. 7-31904 disclose technologies for preventing a buffer under-run by suspending and then resuming recording, and optical disk drives preventing the occurrence of a buffer under-run error, which can be the largest factor of recording failure, have been already provided. Here, the buffer under-run refers to a state where the rate of writing data supplied from a buffer is higher than the rate of transferring data to the buffer so that data stored in the buffer runs short.

There are many other factors of (or causes for) recording failure than the buffer under-run. Vibration and impact, for instance, are factors that cannot be overlooked.

In the case of the occurrence of an impact or a vibration, recording failure can be avoided by first suspending recording at the point of detecting the impact or vibration before the impact or vibration causes a "servo error" (a condition in which a servosystem, or a laser spot, is off track and/or out of focus) or the deterioration of recording quality and then resuming the recording when the impact or vibration disappears. Therefore, by using the above-described technologies of preventing the buffer under-run by suspending and then resuming data recording, recording failure resulting from vibration or impact can be avoided.

The problem, however, is the time lag between the issuance of an instruction to suspend recording and the actual stopping of the recording. If there is a time lag between the occurrence of a recording failure and the suspension of recording, data corresponding to that period is lost. Therefore, the time lag should be minimized.

According to the above-described conventional technologies, there is a fairly long period of time between the detection of a buffer under-run error and the suspension of recording. Therefore, it is sufficient if recording is suspendable by the sector. The direct application of this technique, however, may cause the loss of data for approximately one sector or lead to miswriting of data to the adjacent track, depending on the timing of the occurrence of impact or vibration.

SUMMARY OF THE INVENTION

Accordingly, it is a general object of the present invention to provide an information recording scheme in which the above-described disadvantage is eliminated.

A more specific object of the present invention is to provide an information recording scheme preventing recording failure resulting from impact or vibration by suspending and resuming information recording on a recording medium at a position adjusted more finely than conventionally when the impact or vibration occurs.

The above objects of the present invention are achieved by an information recording apparatus including: an information recording part performing information recording on a recording medium divided into a plurality of sectors each including a plurality of information units; a prediction part detecting or predicting an occurrence of a recording failure during the information recording; a suspension control part that, when the occurrence of the recording failure is detected or predicted, suspends the information recording at the present one of the information units of the recording medium and stores suspension information indicating a suspension position where the information recording is suspended; a determination part determining whether the recording failure is over after the suspension of the information recording; and a resumption control part that, when it is determined that the recording failure is over, causes the information recording part to resume the information recording at a position determined based on the suspension information so that information is continuously recorded on the recording medium over the suspension position.

The above objects of the present invention are also achieved by a method of recording information on a recording medium divided into a plurality of sectors each including a plurality of information units, the method including the steps of: (a) detecting or predicting an occurrence of a recording failure during information recording on the recording medium; (b) suspending, when the occurrence of the recording failure is detected or predicted by the step (a), the information recording at the present one of the information units of the recording medium, and storing suspension information indicating a suspension position where the information recording is suspended; (c) determining whether the recording failure is over after the suspension of the information recording by the step (b); and (d) resuming, when the step (c) determines that the recording failure is over, the information recording at a position determined based on the suspension information so that information is continuously recorded on the recording medium over the suspension position.

The above objects of the present invention are also achieved by a computer-readable recording medium storing a program for causing a computer to execute a method of recording information on a recording-medium divided into a plurality of sectors each including a plurality of information units, the method including the steps of: (a) detecting or predicting an occurrence of a recording failure during information recording on the recording medium; (b) suspending, when the occurrence of the recording failure is detected or predicted by the step (a), the information recording at the present one of the information units of the recording medium, and storing suspension information indicating a suspension position where the information recording is suspended; (c) determining whether the recording failure is over after the suspension of the information recording by the step (b); and (d) resuming, when the step (c) determines that the recording failure is over, the information recording at a position determined based on the suspension information so that information is continuously recorded on the recording medium over the suspension position.

The above objects of the present invention are also achieved by a program for causing a computer to execute a method of recording information on a recording medium divided into a plurality of sectors each including a plurality of information units, the method including the steps of: (a) detecting or predicting an occurrence of a recording failure during information recording on the recording medium; (b) suspending, when the occurrence of the recording failure is detected or predicted by the step (a), the information recording at the present one of the information units of the recording medium, and storing suspension information indicating a suspension position where the information recording is suspended; (c) determining whether the recording failure is over after the suspension of the information recording by the step (b); and (d) resuming, when the step (c) determines that the recording failure is over, the information recording at a position determined based on the suspension information so that information is continuously recorded on the recording medium over the suspension position.

The above objects of the present invention are further achieved by an integrated circuit including: an information recording part performing information recording on a recording medium divided into a plurality of sectors each including a plurality of information units; a prediction part detecting or predicting an occurrence of a recording failure during the information recording; a suspension control part that, when the occurrence of the recording failure is detected or predicted, suspends the information recording at the present one of the information units of the recording medium and stores suspension information indicating a suspension position where the information recording is suspended; a determination part determining whether the recording failure is over after the suspension of the information recording; and a resumption control part that, when it is determined that the recording failure is over, causes the information recording part to resume the information recording at a position determined based on the suspension information so that information is continuously recorded on the recording medium over the suspension position.

According to the present invention, information recording on a recording medium can be suspended and resumed at one of the predetermined information units each smaller than one sector of the recording medium which one corresponds to the present position of the information recording. Therefore, information recording can be resumed successfully without the substantial loss of data after the information is suspended due to impact or vibration.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description will now be given, with reference to the accompanying drawings, of an embodiment of the present invention.

Figure 1:
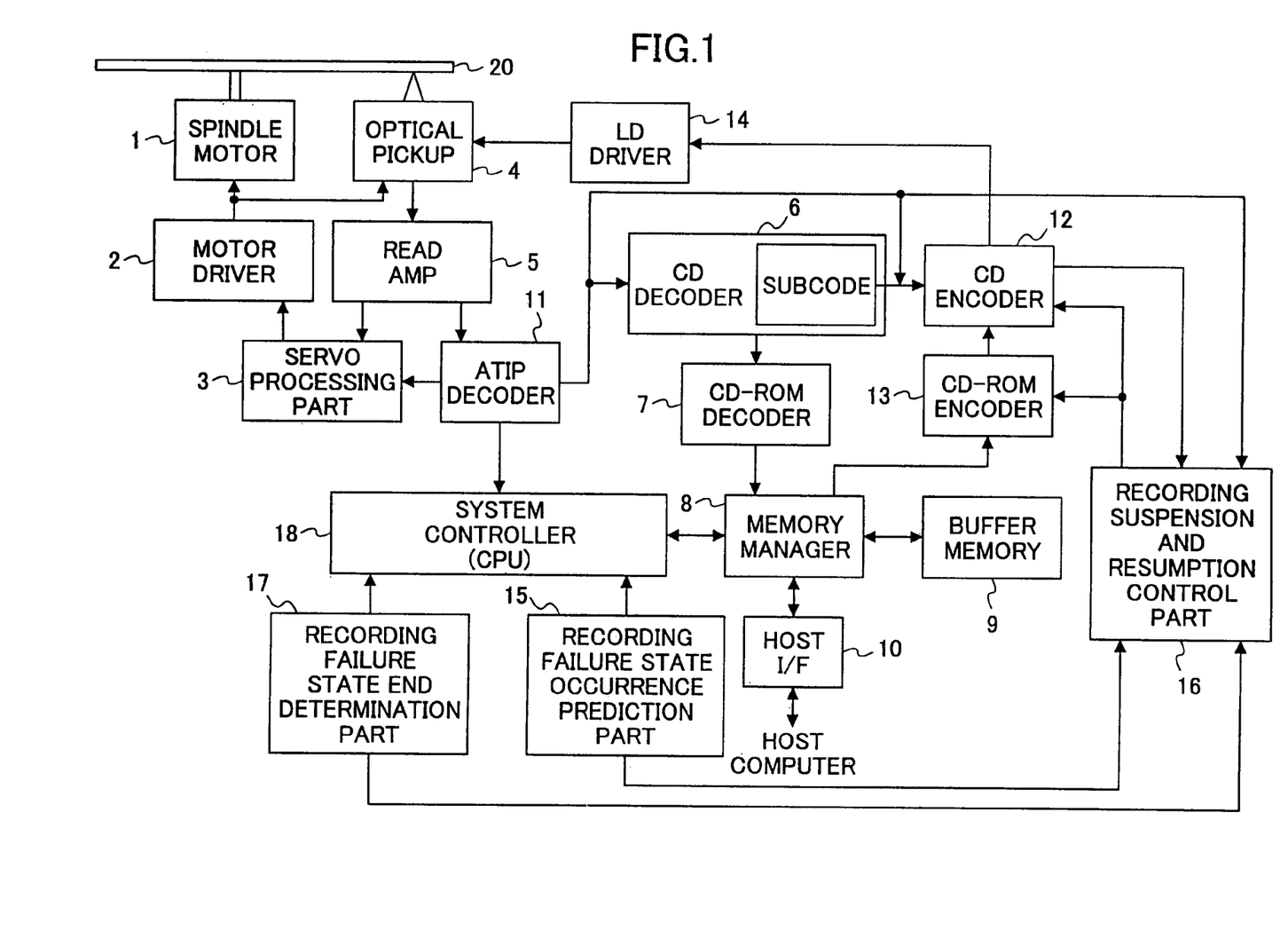
FIG. 1 is a block diagram showing an optical disk drive unit that is an information recording apparatus according to an embodiment of the present invention.

FIG. 1 is a block diagram showing an optical disk drive unit that is an information recording apparatus according to the embodiment of the present invention.

In the drawing, the arrows indicate the flow of typical signals and data, but do not represent all of the connections of each block.

An optical disk 20 is a recording medium such as a CD-R or CD-RW disk. Tracks are formed on the recording surface of the optical disk 20. Addresses are recorded on the recording surface of the optical disk 20 during its manufacturing process or by data recording. The optical disk 20 is rotated by a spindle motor 1 at a given speed of rotation at the time of recording and reproducing information (data).

The spindle motor is controlled by a motor driver 2 and a servo processing part 3 so as to rotate at a constant linear or angular velocity. The linear or angular velocity can be varied step by step.

An optical pickup 4 includes a semiconductor laser, an optical system, a focus actuator, a tracking actuator, a light-receiving element, and a position sensor of well-known technologies, which are not graphically represented in FIG. 1. The optical pickup 4 records data on and reads out data from the optical disk 20 by emitting a laser light thereonto. Further, the optical pickup 4 can be moved by a seek motor. The focus actuator, the tracking actuator, and the seek motor are controlled by the motor driver 2 and the servo processing part 3 based on signals obtained from the light-receiving element and the position sensor so that a laser spot is positioned at a target point of recording or reproduction on the optical disk 20.

In the optical disk drive unit of FIG. 1, when a system controller (CPU) 18 receives a read command from a host computer through a host interface (I/F) 10, the laser spot is moved to a position a little before the position of a target address based on the addresses recorded on the optical disk 20. Then, scanning is initiated to start data reading.

A reproduced signal obtained in the optical pickup 4 is amplified and binarized (converted into a binary signal) in a read amplifier 5. Thereafter, the binarized signal is input to a CD decoder 6 to be subjected to deinterleaving and error correction. Next, the output data of the CD decoder 6 is input to a CD-ROM decoder 7 to be subjected again to error correction to increase data reliability.

When the target address is reached, a memory manager (buffer manager) 8 temporarily stores the data in a buffer memory (buffer RAM) 9, and when the data is set as sector data, the data is transmitted at a time to the host computer through the host I/F 10.

On the other hand, when the CPU 18 receives a write command from the host computer through the host I/F 10, the memory manager 8 temporarily stores data transmitted successively after the write command from the host computer through the host I/F 10 in the buffer memory 9.

The CPU 18 starts writing when a certain amount of data has been stored in the buffer memory 9. Before starting writing, the CPU 18 moves the laser spot to the address position of a write start point. This point can be obtained from a wobble signal that is prewritten on the optical disk 20 by the wobble of the tracks. The wobble signal contains absolute time information called ATIP (Absolute Time In Pregroove), and an ATIP decoder 11 extracts positional information, that is, addresses.

A synchronization signal generated by the ATIP decoder 11 is input to a CD encoder 12 so that data writing can be started at the correct position. A CD-ROM encoder 13 and the CD encoder 12 add error-correcting codes to and perform interleaving on the data stored in the buffer memory 9, and the CD encoder 12 performs eight to fourteen modulation (EFM) for recording on the data to output an EFM-modulated signal for recording to an LD control part (LD driver) 14. The laser beam controlled by the LD control part 14 and the optical pickup 4 is caused to start scanning and recording the data from the target address position based on the addresses on the optical disk 20. The LD driver 14 causes the semiconductor laser to emit the laser beam at the write-power level., and constantly controls the state of light emission so that data recording and reproduction can be performed properly.

A recording failure state occurrence prediction part (hereinafter simply referred to as prediction part) 15 detects or predicts the occurrence of a recording failure (the occurrence of a state of recording failure) due to vibration or impact during the above data recording.

When the prediction part 15 detects or predicts the occurrence of a recording failure, a recording suspension and resumption control part 16 causes the CD encoder 12, for instance, to suspend the data recording at one of predetermined information units each smaller than one sector which one corresponds to the present position of the data recording, and stores suspension information indicating the position of the suspension.

When the recording suspension and resumption control part 16 suspends the data recording, a recording failure state end determination part (hereinafter simply referred to as a determination: part) 17 determines whether the recording failure is over.

When the determination part 17 determines that the recording failure is over, the recording suspension and resumption control part 16 and the CPU 18 cause the CD encoder 12, for instance, to resume the data recording from a position based on the suspension information so that data continuity is maintained.

In the case of recovering from a failure caused by impact or vibration by a conventional measure such as data rewriting or the replacement operation, the measure may be taken after the occurrence of the failure. However, in the case of avoiding failure by suspending recording as in this embodiment, it is required to determine the start and end of the failure reliably. Therefore, the prediction part 15 and the determination part 17 are provided.

The above-described components 1 through 9, 11 through 14, and 18 of the optical disk drive unit form an information recording part that scans the tracks on the optical disk 20 and starts recording from an address position based on the addresses recorded on the optical disk 20.

The CPU 18, which is a microcomputer that controls the entire optical disk drive unit of this embodiment, also performs operations relating to the present invention.

Further, each of the above-described parts 15 through 17 of the optical disk drive unit is also realized by a microcomputer.

Figure 2:
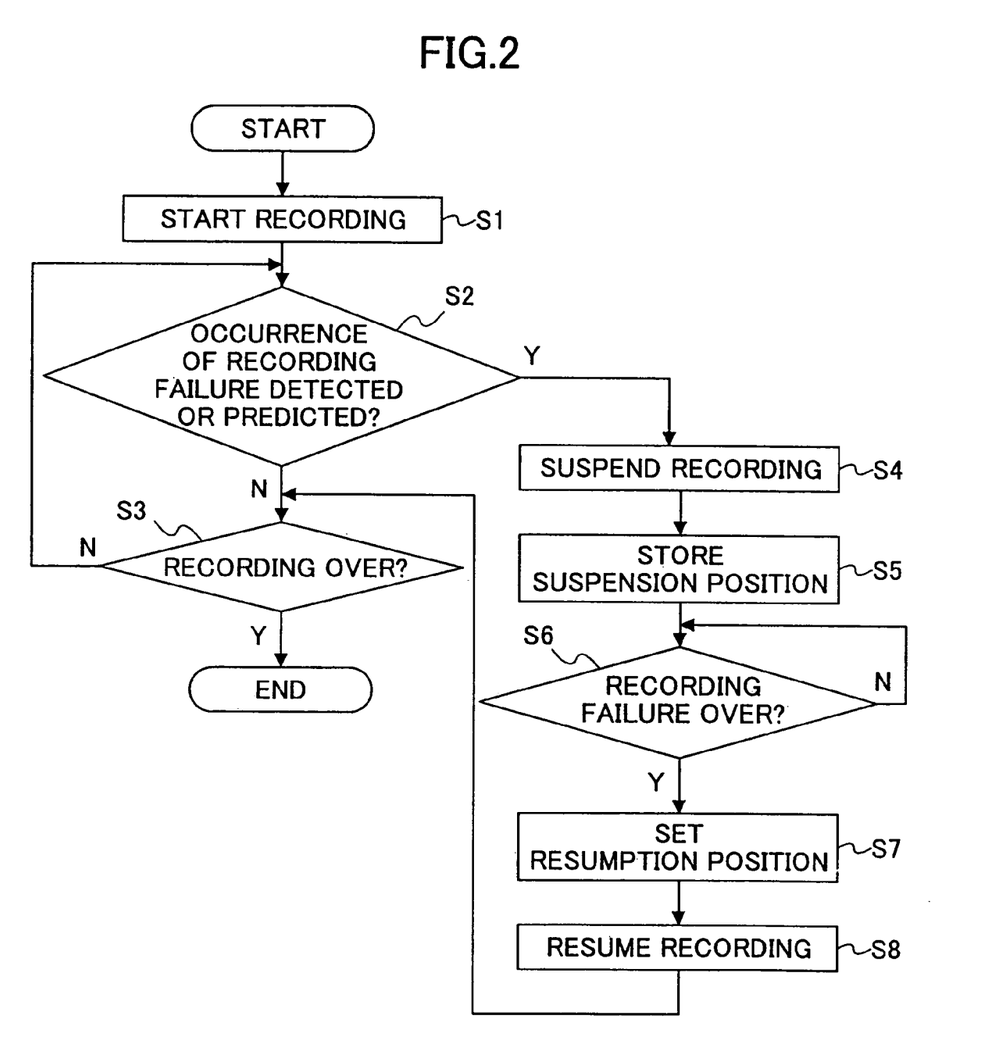
FIG. 2 is a flowchart of a data recording operation in the optical disk drive unit of FIG. 1.

FIG. 2 is a flowchart of a data recording operation in the optical disk drive unit of FIG. 1.

When the CPU 18 starts data recording in step S1, in step S2, during the data recording, the prediction part 15 constantly detects and/or predicts the occurrence of a recording failure due to vibration or impact, such as a servo error, until the end of the data recording. If no occurrence of a recording failure is detected or predicted in step S2, in step S3, it is determined whether the data recording is over. If it is determined in step S3 that the data recording is not over, the operation returns to step S2. If it is determined in step S3 that the data recording is over, the data recording operation ends.

If the occurrence of a recording failure is detected or predicted in step S2, in step S4, the recording suspension and resumption control part 16 causes the CD encoder 12, with predetermined timing, to suspend the data recording at the present one of the predetermined information units each smaller than one sector (address block), and notifies the CPU 18 of the suspension of the data recording. At this point, in step S5, the recording suspension and resumption control part 16 stores an address at which the data recording is suspended and the number of EFM frame synchronizing pulses and the number of EFM bit clock pulses after a block synchronizing signal in an internal register (not shown in the drawings) as information on the position of the suspension of the data recording (hereinafter this position is referred to as a suspension position). Further, the recording suspension and resumption control part 16 stores data in the middle of being processed by the encoding process in the CD encoder 12 as it is in the internal RAM thereof. The CPU 18 causes the optical pickup 4, by a jump back operation, to wait near the suspension position until the recording failure ends. If the recording failure lasts longer than a predetermined period, the data recording may be terminated completely.

After the recording suspension and resumption control part 16 stores the suspension position information in step S5, in step S6, the determination part 17 determines whether the recording failure is over. If it is determined in step S6 that the recording failure is over, in step S7, the CPU 18 positions the laser spot before the suspension position of the data recording, and reproduces the previously recorded data. Addresses, the block synchronization signal, the EFM frame synchronization signal, and the EFM bit clock signal are extracted from the reproduced signal and input to the recording suspension and resumption control part 16. The recording suspension and resumption control part 16 cancels the suspension of the data recording and causes the CD encoder 12 to resume the data recording when the extracted signals match information on the position of the resumption of the data recording. Then, the operation proceeds to step S3.

That is, by the operations of steps S7 and S8, the CPU 18 and the recording suspension and resumption control part 16 resume the data recording at a position determined based on the suspension position information so that the data is continuously recorded over the suspension position, or data continuity is maintained over the suspension position.

Thus, a write error resulting from impact or vibration is prevented from occurring during data recording on an optical disk.

Data recording is required to be suspended by the predetermined information unit smaller than the sector. Therefore, the EFM bit clock signal may be employed as a reference signal in determining the suspension position.

The EFM bit clock pulses are the smallest units in data reproduction. In the case of the CD, for instance, there are 57,264 EFM bit clock pulses generated per sector. Therefore, by using the EFM bit clock signal as a reference signal in determining the suspension position, the data recording can be suspended at high speed at a position determined very finely.

Figure 3:
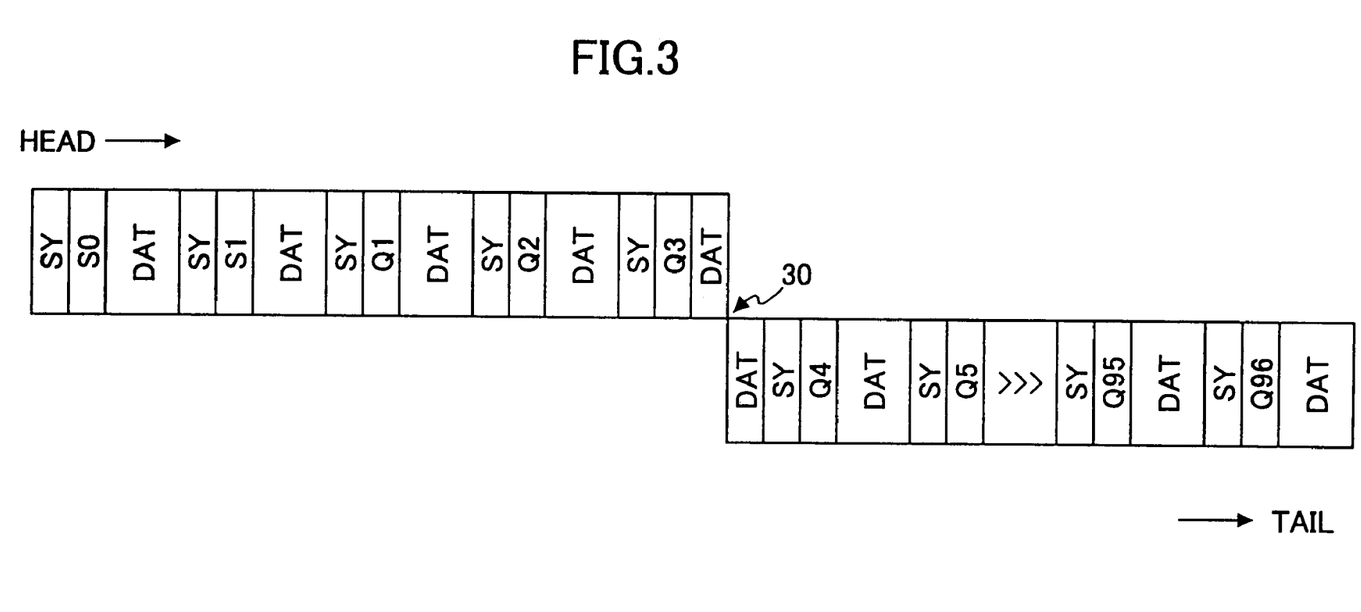
FIG. 3 is a diagram showing a sector format that enables data recording to be suspended with the accuracy of an EFM bit clock pulse that is a predetermined information unit smaller than the sector according to the present invention.

FIG. 3 is a diagram showing a sector format that enables data recording to be suspended with the accuracy of the EFM bit clock pulse that is the predetermined information unit smaller than the sector.

In FIG. 3, SY indicates the EFM frame synchronizing signal. S0 and S1 are subcode synchronizing signals, which are the above-described block synchronizing signal. Q1 through Q96 are subcode data. DAT, the data of each EFM frame, includes data such as an error-correcting code (ECC).

As shown in FIG. 3, with the accuracy of the EFM bit clock pulse, the data recording can be suspended even in the middle of the DAT at the position indicated by an arrow 30 in FIG. 3. In other words, the data recording can be suspended substantially at any position.

That is, in the case of suspending data recording at the time of recording failure, the time lag between the detection of the recording failure and the suspension of the data recording can be reduced considerably compared with the conventional technologies so that damage (loss of data) caused by the time lag can be minimized.

Thus, by determining the suspension position by employing the EFM bit clock signal as a reference signal, the time lag between the detection of the recording failure due to impact or vibration, such as a servo error, and the suspension of data recording can be minimized so that loss of data is hardly caused by the time lag.

Generally, a sector is composed of a plurality of small blocks, and each block includes a synchronizing signal so that a signal can be read with accuracy. Data recording may be suspended at the present one of format units each including one pulse of the synchronizing signal. That is, data recording may be suspended at the present one of format units that are defined so that each predetermined information unit smaller than one sector includes one pulse of the synchronizing signal necessary for data reproduction.

In the case of the CD, this block is referred to as an EFM frame, and one sector includes 98 EFM frames. Further, in the case of CD, a burst error of one EFM frame, that is, the loss of data for one EFM frame, can be corrected or compensated for completely. Accordingly, data recording can be performed with sufficient accuracy without suspending the data recording by the EFM bit clock pulse as described above.

Particularly, in the case of suspending and resuming data recording in the middle of one EFM frame with the accuracy of the EFM bit clock pulse, it is probable that data recorded after the suspension (succeeding data) cannot be reproduced normally due to its inconsistency with the preceding data if the preceding and succeeding data are incorrectly connected at the time of resuming the data recording.

Therefore, by suspending and resuming the data recording at the position of the synchronizing signal (pulse) of the EFM frame, the accuracy error occurring at that time is absorbed by resynchronization, so that it is probable that the succeeding data can be reproduced normally according to this embodiment.

Figure 4:
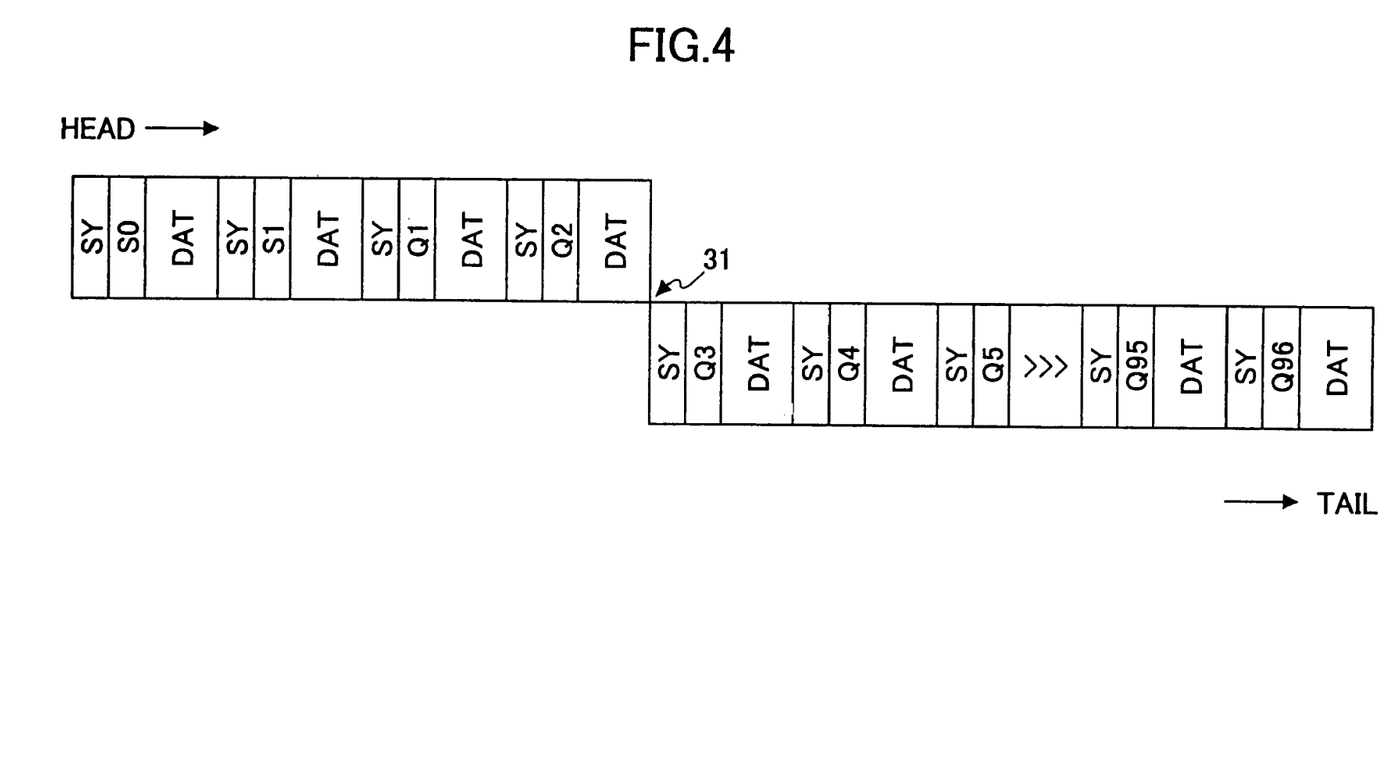
FIG. 4 is a diagram showing a sector format that enables data recording to be suspended with the accuracy of an EFM frame that is a predetermined information unit smaller than the sector according to the present invention.

FIG. 4 is a diagram showing a sector format that enables data recording to be suspended with the accuracy of the EFM frame that is the predetermined information unit smaller than the sector.

In FIG. 4, SY indicates the EFM frame synchronizing signal. S0 and S1 are subcode synchronizing signals, which are the above-described block synchronizing signal. Q1 through Q96 are subcode data. DAT, the data of each EFM frame, includes data such as an ECC.

As shown in FIG. 4, one sector has only 98 instants (points) for the suspension of data recording. Therefore, in the case of suspending data recording with the accuracy of the EFM frame as indicated by an arrow 31 in FIG. 4, if the laser spot goes off track before the suspension of the data recording, data for a maximum of one EFM frame may be lost.

However, in the case of a recording operation on a CD-R disk at the speed of 1×, for instance, the time length of one EFM frame is 1/75/98=136 μs, which is a small amount of time-compared with the amount of time required for a mechanical operation. Therefore, the possibility of data loss is extremely low.

Thus, by employing the EFM frame as a reference signal to determine the suspension position, the recording suspension and resumption control part 16 is allowed to have a simpler circuit configuration than in the case of performing data recording suspension with the accuracy of the EFM bit clock pulse. Further, the possibility of normal reproduction of data is increased even if there is a slight gap between the suspension position and the resumption position of recording of the data.

Figure 5:
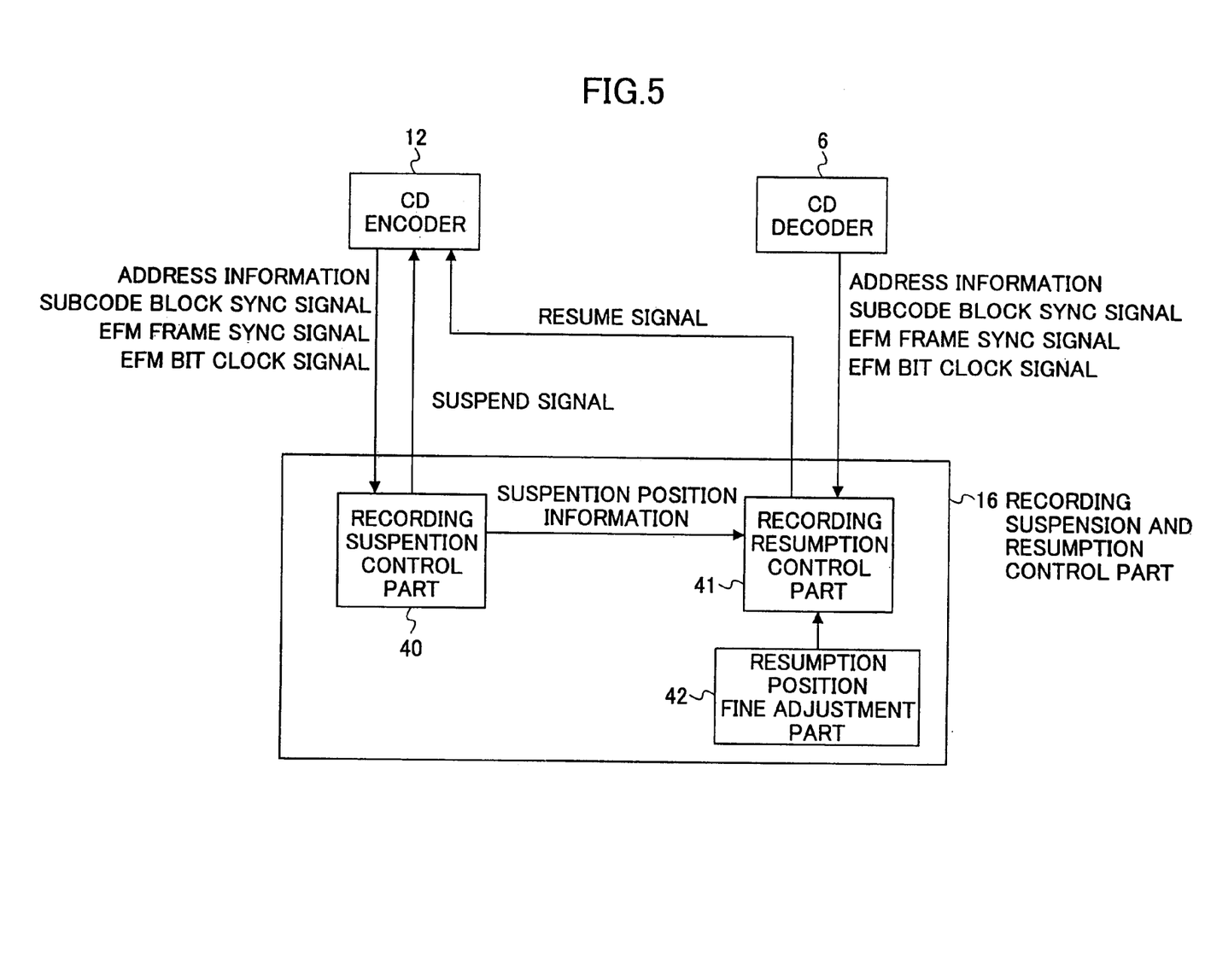
FIG. 5 is a block diagram showing the internal configuration of a recording-suspension and resumption control part of the optical disk drive unit of FIG. 1.

FIG. 5 is a block diagram showing the internal configuration of the recording suspension and resumption control part 16. A more detailed description will be given, based on FIG. 5, of the recording suspension control operation and the recording resumption control operation of the recording suspension and resumption control part 16.

The recording suspension and resumption control part 16 includes a recording suspension control part 40, a recording resumption control part 41, and a resumption position fine adjustment part 42.

During data recording, the CD encoder 12 supplies the recording suspension control part 40 with address information, the subcode block synchronizing signal, the EFM frame synchronizing signal, and the EFM bit clock signal that are in the middle of the encoding process.

The recording suspension control part 40 latches the address information, and counts the number of EFM frame synchronizing pulses and the number of EFM bit clock pulses based on the subcode block synchronizing signal. When a suspend signal is generated, the numbers (values) at that point are retained to be used as information on the suspension position.

When a recording failure occurs during the data recording, the recording suspension control part 40 generates the suspend signal at the edge of the corresponding EFM bit clock pulse so as to suspend the CD encoder 12. Alternatively, the recording suspension control part 40 generates the suspend signal at the next EFM frame synchronizing pulse so as to suspend the CD encoder 12.

Thereafter, when the recording failure is over, the CPU 18 sets the resumption position of the data recording (recording resumption position) in the recording resumption operation part 41 based on the address of the suspension position (suspension position information), and starts to read the data from a position a little before the resumption position. The address information, the subcode block synchronizing signal, the EFM frame synchronizing signal, and the EFM bit clock signal of the read-out data are supplied from the CD decoder 6 to the recording resumption control part 41. These signals may be delayed with respect to the physical read-start position due to decoding. In such a case, the resumption position fine adjustment part 42 performs, based on the delay, fine adjustment on the setting of the resumption position of the data recording in the recording resumption control part 41.

The recording resumption position may be set without the intervention of the CPU 18, but can be set more easily by the fine adjustment through the CPU 18. Further, the fine adjustment should be performed based on a recording rate.

The recording resumption control part 41 latches the address information, and counts the number of EFM frame synchronizing pulses and the number of EFM bit clock pulses based on the subcode block synchronizing signal. Then, the recording resumption control part 41 compares the numbers (values) and the address information with the setting of the recording resumption position. If the numbers and the address information match the setting of the recording resumption position, the recording resumption control part 41 outputs to the CD encoder 12 a resume signal that causes the CD encoder 12 to resume the data recording. The resume signal cancels the suspension of the CD encoder 12, and the CD encoder 12 resumes the data recording from the suspension position so that data continuity is maintained.

Recording failure due to disturbance is generated by a servo error or a disturbance in the servosystem. Therefore, it is extremely effective to predict the occurrence of a recording failure and determine the end of the recording failure by monitoring servo signals by each of the prediction part 15 and the determination part 17.

Generally, a servo error at the time of recording (writing) is monitored in the optical disk drive unit in order to prevent recorded data from being damaged by the servo error. This monitoring is often performed by determining whether the servo signals exceed respective predetermined levels.

That is, a hardware configuration for monitoring the servo signals is generally provided to the conventional optical disk drive unit, and by using such a hardware configuration, such monitoring can be performed without an additional sensor and therefore without an increase in cost.

However, a difference should be made between the detection of a servo error and the prediction of a state where a servo error is likely to occur that will deteriorate recording quality. Therefore, the predetermined levels should be lowered to increase detection sensitivity.

That is, the prediction part 15 detects and/or predicts the occurrence of a recording failure during data recording based on the result of determination as to whether a focus servo signal and/or a tracking servo signal exceed(s) the predetermined level(s).

Further, the determination part 17 determines whether the recording failure is over based on the result of determination as to whether the focus servo signal and/or the tracking servo signal exceed(s) the predetermined level(s) after the suspension of the data recording.

Thus, a write error caused by impact or vibration can be prevented from occurring without providing an additional impact sensor. Further, cost reduction can be realized compared with the case of using an additional impact sensor.

In the case of detecting and/or predicting recording failure and determining the end of the recording failure by monitoring the above-described servo signals, the occurrence of a recording failure may be detected wrongly by the internal vibration of the optical disk drive unit or a defect in the optical disk.

The conventional optical disk drive unit has its optical pickup provided inside a vibration isolating mechanism so that no problem is caused even if a certain impact or vibration is applied. Therefore, impact or vibration can be detected with higher sensitivity by providing an impact sensor outside the vibration isolating mechanism.

That is, an impact sensor functioning as a vibration and impact detection part that detects vibration or impact during data recording may be provided outside the above-mentioned vibration isolating mechanism, for instance.

Then, the prediction part 15 may detect or predict the occurrence of a recording failure based on the result of determination as to whether a vibration or impact signal detected by the impact sensor during data recording exceeds a predetermined level. Further, the determination part 17 may determine whether the recording failure is over based on the result of determination as to whether the vibration or impact signal detected by the impact sensor exceeds the predetermined level after the suspension of the data recording.

Thus, although an increase in cost is inevitable, the addition of the impact sensor leads to reliable and stable impact detection.

Further, as the rate of data reproduction increases, more than a few optical disk drive units have come to employ a mechanism that reduces the number of revolutions when vibration occurs due to the high-speed rotation of an optical disk.

In such optical disk drive units, a vibration sensor is used for vibration detection. Therefore, if such a vibration sensor is used for the above-described impact detection, no additional sensor is required.

Thus, the detection of impact or vibration is ensured, and the occurrence of a write error due to impact of vibration can be prevented with good accuracy. Further, the optical disk drive unit is less likely to be affected by its internal vibration.

Figure 6A:
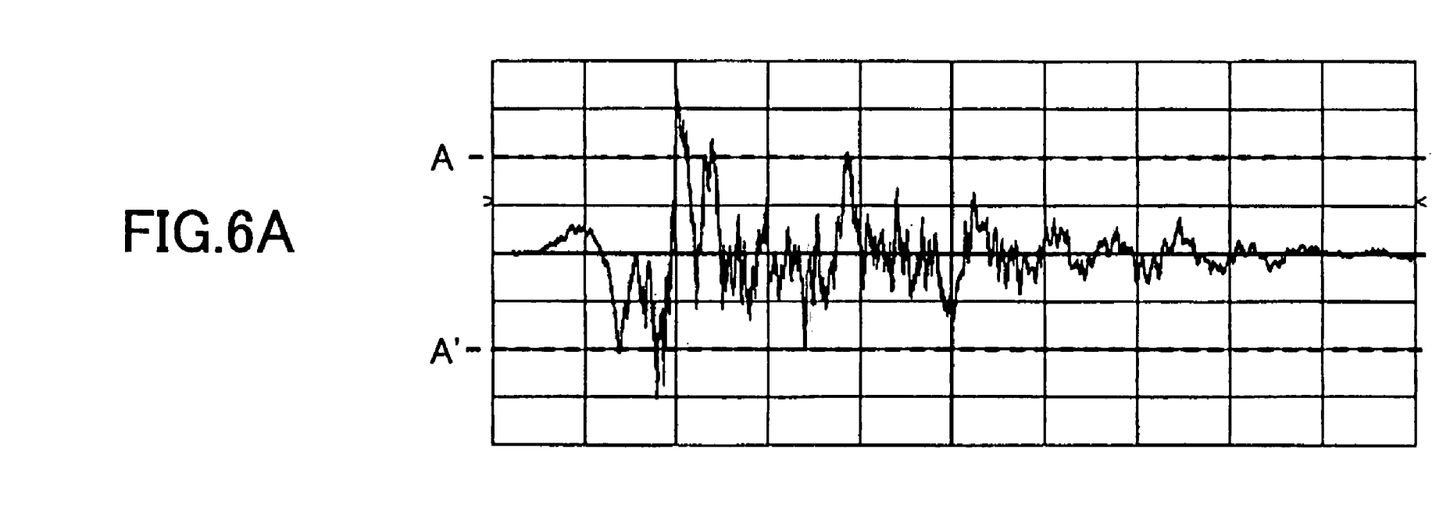
FIG. 6A is a waveform chart showing an output signal of an impact sensor according to the present invention when the optical disk drive unit of the present invention is subjected to impact.
Figure 6B:
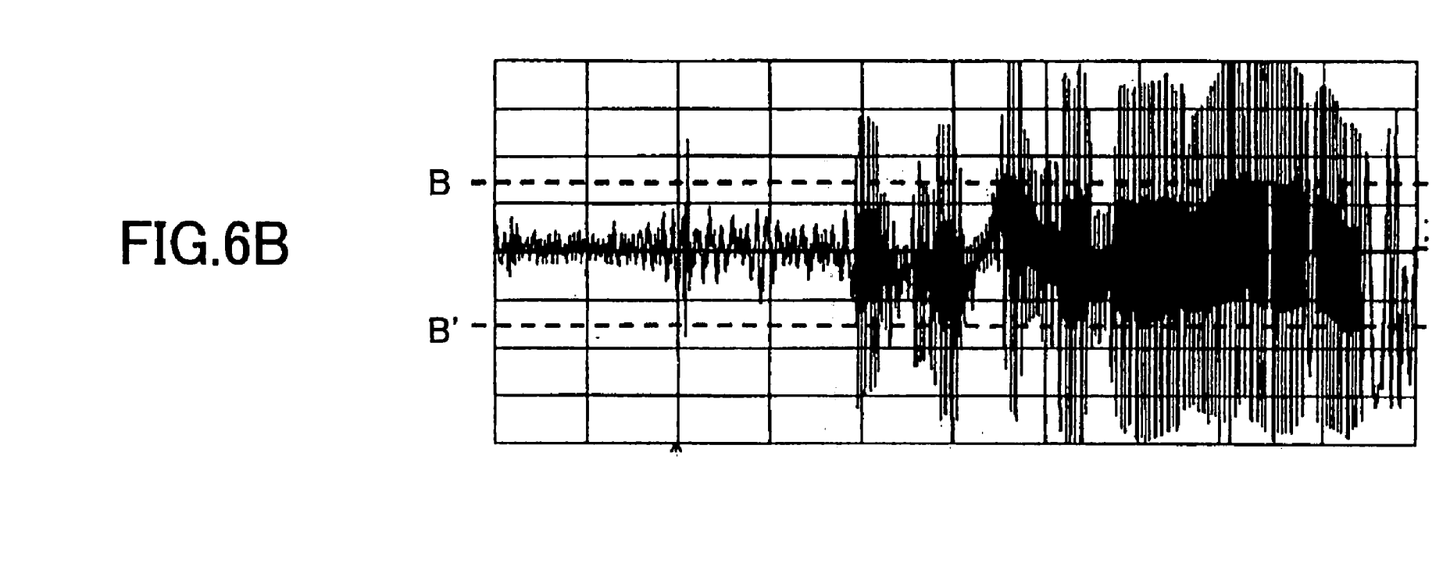
FIG. 6B is a waveform chart showing a tracking control signal at that time according to the present invention.

FIG. 6A is a waveform chart showing an output signal of the impact sensor when the optical disk drive unit is subjected to impact, and FIG. 6B is a waveform chart showing a tracking control signal at that time.

As shown in FIG. 6B, when impact is applied to the optical disk drive unit, noise is caused in the tracking control signal. Therefore, a signal obtained as a result of subjecting the tracking control signal to window comparison with predetermined values (levels) B and B' is used for the detection or prediction of the occurrence of a recording failure and the determination of the end of the recording failure.

That is, the prediction part 15 detects or predicts the occurrence of a recording failure if the tracking servo signal (tracking control signal) falls outside the range ("window") of the predetermined level B to the predetermined level B' during data recording. Further, the prediction part 15 determines that there is no occurrence or no possibility of the occurrence of recording failure if the tracking servo signal falls within the above-described range during data recording.

Further, the determination part 17 determines that the recording failure is over if the tracking servo signal falls within the above-described range after the suspension of the data recording, and determines that the recording failure is not over if the tracking servo signal falls outside the above-described range after the suspension of the data recording.

On the other hand, as shown in FIG. 6A, a signal obtained as a result of subjecting the signal of the impact sensor (newly provided or preinstalled) output when the optical disk drive unit is subjected to impact to window comparison with predetermined values (levels) A and A' is used for the detection or prediction of the occurrence of a recording failure and the determination of the end of the recording failure.

That is, the recording failure state occurrence prediction part 15 detects or predicts the occurrence of a recording failure if the output signal of the impact sensor falls outside the range of the predetermined level A to the predetermined level A' during data recording. On the other hand, the prediction part 15 determines that there is no occurrence or no possibility of the occurrence of recording failure if the output signal of the impact sensor falls within the above-described range during data recording.

Further, the determination part 17 determines that the recording failure is over if the output signal of the impact sensor falls within the above-described range after the suspension of the data recording, and determines that the recording failure is not over if the output signal of the impact sensor falls outside the above-described range after the suspension of the data recording.

Thus, in each case, it is determined that there is an occurrence of a recording failure if the tracking servo signal or the output signal of the impact sensor falls outside the window, and it is determined that the recording failure is over if the signal falls within the window. Further, under certain conditions, it is required to provide a filter circuit so that the tracking servo signal or the output signal of the impact sensor is processed in the filter circuit before being input to the window comparator, or it is necessary to validate the output of the comparator only if the output has a certain time length.

The above description based on FIG. 6A is given of the case where the tracking servo signal is employed in the detection or prediction of the occurrence of a recording failure and the determination of the end of the recording failure. The detection or prediction of the occurrence of a recording failure and the determination of the end of the recording failure may also be performed using the window as in the above-described case with the focus servo signal (focus control signal) or both of the tracking and focus servo signals.

As described above, according to the information recording apparatus of the present invention, if a vibration or impact occurs during data recording on a recording medium, a recording failure due to the vibration or impact can be prevented by suspending and recording the data recording at a position adjusted more finely than conventionally.

The present invention is not limited to the specifically disclosed embodiment, but variations and modifications may be made without departing from the scope of the present invention.

The present application is based on Japanese priority application No. 2001-276971 filed on Sep. 12, 2001, the entire contents of which are hereby incorporated by reference.

What is claimed is:

1. A method of recording information on a non-rewritable recording medium, the method comprising the steps of:
   receiving an impact applied to a recording device;
   responsive to the impact applied to the recording device, suspending the recording of the information at a suspension position on the recording medium; and
   subsequently, resuming the recording of the information at a resumption position on the recording medium, wherein the suspension position and the resumption position are separated by a gap.

2. The method of claim 1, further comprising the step of suspending the recording of the information in response to a buffer under-run condition, and subsequently resuming the recording of the information.

3. A method of recording information on a non-rewritable recording medium supported by a recording device, said recording medium being divided into a plurality of sectors each including a plurality of information units, the method comprising the steps of:
   (a) detecting or predicting an occurrence of a recording failure caused by an impact applied to the recording device during information recording on the recording medium;
   (b) suspending, when the occurrence of the recording failure is detected or predicted by said step (a), the information recording at a suspension position on the recording medium;
   (c) determining whether the recording failure is over after the suspension of the information recording by said step (b); and
   (d) resuming at a resumption position on the recording medium, when said step (c) determines that the recording failure is over, the information recording at the suspension position so that information is continuously recorded on the recording medium over the suspension position, wherein the suspension position and the resumption position are separated by a gap.

4. An information recording apparatus comprising:
   an information recording part performing information recording on a non-rewritable recording medium divided into a plurality of sectors each including a plurality of information units;
   a prediction part detecting or predicting an occurrence of a recording failure caused by an impact applied to the apparatus during the information recording;
   a suspension control part that, when the occurrence of the recording failure is detected or predicted, suspends the information recording at a suspension position; and
   a resumption control part that causes said information recording part to resume the information recording at a resumption position so that information is continuously recorded on the recording medium over the suspension position, wherein the suspension position and the resumption position are separated by a gap.

5. The information recording apparatus as claimed in claim 4, further comprising a device for suspending the information recording in response to a buffer under-run condition.

6. The information recording apparatus as claimed in claim 5, wherein said information recording part scans a track of the recording medium and records the information from an address position based on addresses prerecorded on the recording medium.

7. The information recording apparatus as claimed in claim 5, wherein each of the information units is a bit clock pulse.

8. The information recording apparatus as claimed in claim 5, wherein each of the information units is a format unit including a synchronizing clock signal necessary for information reproduction.

9. The information recording apparatus as claimed in claim 5, wherein said prediction part detects or predicts the occurrence of the recording failure based on whether a servo signal exceeds a predetermined level.

10. A method of recording information on a non-rewritable recording medium, the method comprising the steps of:
   responsive to a servo condition, suspending the recording of the information at a suspension position on the recording medium, and resuming the recording of the information essentially at the suspension position on the recording medium; and
   responsive to a buffer under-run condition, suspending the recording of the information, and subsequently resuming the recording of the information.

11. An information recording apparatus comprising:
   an information recording part performing information recording on a non-rewritable recording medium divided into a plurality of sectors each including a plurality of information units;
   a prediction part using a servo condition to detect or predict an occurrence of a recording failure;
   a suspension control part that, when the occurrence of the recording failure is detected or predicted, suspends the information recording at a suspension position; and
   a resumption control part that causes said information recording part to resume the information recording so that information is continuously recorded on the recording medium over the suspension position; and
   a device for suspending the information recording in response to a buffer under-run condition.

12. The information recording apparatus as claimed in claim 11, wherein said information recording part scans a track of the recording medium and records the information from an address position based on addresses prerecorded on the recording medium.

13. The information recording apparatus as claimed in claim 11, wherein each of the information units is a bit clock pulse.

14. The information recording apparatus as claimed in claim 11, wherein each of the information units is a format unit including a synchronizing clock signal necessary for information reproduction.

15. The information recording apparatus as claimed in claim 11, wherein said prediction part detects or predicts the occurrence of the recording failure based on whether a servo signal exceeds a predetermined level.

* * * * *